United States Patent [19]

Sampei et al.

[11] Patent Number: 5,481,425
[45] Date of Patent: Jan. 2, 1996

[54] MAGNETIC HEAD FOR A HARD DISK DEVICE HAVING A NON-MAGNETIC TRAILING CORE

[75] Inventors: Hiroshi Sampei; Masashi Sato, both of Yamagata, Japan

[73] Assignee: Mitsumi Electric Co., Ltd., Tokyo, Japan

[21] Appl. No.: 280,822

[22] Filed: Jul. 26, 1994

[30] Foreign Application Priority Data

Sep. 27, 1993 [JP] Japan ............................ 5-056748 U
Sep. 27, 1993 [JP] Japan ............................ 5-056749 U

[51] Int. Cl.$^6$ ............................................. G11B 5/147
[52] U.S. Cl. ................................................. 360/126
[58] Field of Search ................................... 360/126

[56] References Cited

U.S. PATENT DOCUMENTS 5,233,492  8/1993  Iwata ............................... 360/126
5,276,575  1/1994  Kobayashi ........................ 360/126

*Primary Examiner*—A. J. Heinz
*Attorney, Agent, or Firm*—Whitham, Curtis, Whitham & McGinn

[57] ABSTRACT

A magnetic head in a hard disk device includes a leading core and a trailing core having a magnetic circuit winding, the trailing core is made of non-magnetic monocrystal ferrite, and magnetic metal films are provided in the magnetic path forming regions of the leading core and the trailing core.

20 Claims, 4 Drawing Sheets

MAGNETIC HEAD FOR A HARD DISK DEVICE HAVING A NON-MAGNETIC TRAILING CORE

BACKGROUND OF THE INVENTION

1. Field of the Invention

This invention relates to a hard disk device, which is a magnetic memory device for personal computers, word processors and so forth, and more particularly to a magnetic head for such a hard disk device.

2. Related Art

A variety of magnetic heads different in structure and in configuration have been proposed for hard disk devices, which are magnetic memory means for such electronic devices as those mentioned above, depending on the purposes of use and the functions required. FIGS. 5(a) and (b) show a monolithic type magnetic head 1 for a hard disk device. More specifically, FIG. 5(a) is a perspective view of the magnetic head 1, and FIG. 5(b) is a sectional view showing essential components of a leading core and a trailing core in the magnetic head 1.

The conventional monolithic type magnetic head 1, as shown in FIGS. 5(a) and (b), comprises: the trailing core 2, and the leading core 3 serving as a slider. The trailing core 2 and the leading core 3 are both made of a magnetic substance such as ferrite. Magnetic metal films 4 and 5 are formed on the junction surfaces of the trailing core 2 and the leading core 3, respectively, which are the magnetic path forming regions thereof. The trailing core 2 has a winding.

FIG. 6(a) and (b) show a conventional composite type magnetic head 10 for a hard disk device. More specifically, FIG. 6(a) is a perspective view of the magnetic head 10, and FIG. 6(b) is a sectional view showing essential components of a head core 11 which forms a magnetic circuit in the magnetic head 10.

The conventional composite type magnetic head 10, as shown in FIG. 6, comprises: the aforementioned head core 11 made of a magnetic substance such as ferrite; and a slider 12 made of a non-magnetic substance such as ceramic. The head core 11 is made up of a trailing core 13 and a leading core 14, which have magnetic metal films 15 and 16 on their junction surfaces, respectively.

In the conventional hard disk magnetic heads 1 and 10 designed as described above, the magnetic circuits of the trailing cores and the leading cores are formed by the ferrite and the magnetic metal films 4 and 5, and 15 and 16 formed on the ferrite.

Hence, in each of the trailing cores of the magnetic heads 1 and 10 which have the windings, the ratio of inductance to output is liable to be high, so that it is difficult to improve the high frequency characteristic thereof. In addition, because of the high ratio of inductance to output, it is impossible to use a head amplifier which is extensively employed for a thin film head. This makes it difficult to reduce the manufacturing cost of the hard disk device.

Furthermore, the transition of a magnetic domain wall due to the formation of a magnetic domain wall of ferrite near the air bearing surfaces of the leading core and the trailing core is not smooth, thus resulting in the occurrence of "wiggle".

SUMMARY OF THE INVENTION

In view of the above-described problems accompanying a conventional hard disk magnetic head, an object of the invention is to provide a magnetic head for a hard disk device which is smaller in inductance, and is free from the occurrence of "wiggle".

The foregoing object of the invention has been achieved by the provision of a magnetic head for a hard disk device which comprises: a leading core and a trailing core having a magnetic circuit winding, the trailing core being made of non-magnetic substance; and magnetic metal films formed in the magnetic path forming regions of the leading core and the trailing core, wherein the trailing core is made of non-magnetic monocrystal ferrite.

In the magnetic head of the invention, the magnetic path forming regions are made up of the magnetic metal films only. Therefore, with the winding applied to the magnetic circuit, the ratio of inductance to output is low, and accordingly the magnetic head is improved in high frequency characteristic.

DETAILED DESCRIPTION OF THE PREFERRED EMBODIMENTS

Preferred embodiments of the invention will be described with reference to the accompanying drawings.

Figure 1:
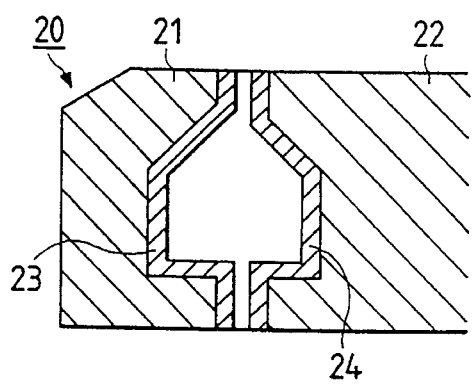
FIG. 1 is a sectional view showing essential components of one example of a magnetic head according to the invention, namely, a monolithic type magnetic head.
Figure 2:
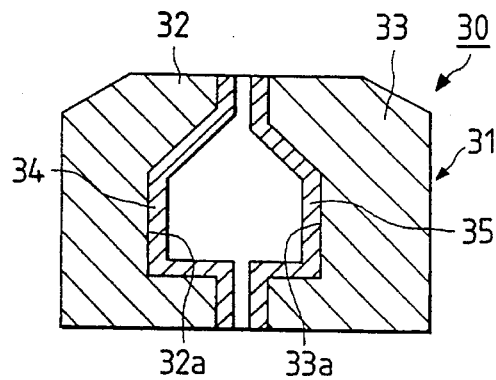
FIG. 2 is also a sectional view showing essential components of another example of the magnetic head according to the invention, namely, a composite type magnetic head.

FIG. 1 is a sectional view showing essential components of an example of a magnetic head according to the invention, namely, a monolithic type magnetic head 20, and FIG. 2 is also a sectional view showing essential components of another example of the magnetic head according to the invention, namely, a composite type magnetic head 30.

The magnetic head 20, as shown in FIG. 1, comprises: a trailing core 21 having a magnetic circuit winding; and a leading core 22 serving as a slider adapted to hold the trailing core. Magnetic metal films 23 and 24 are formed on the surfaces of the trailing core 21 and the leading core 22 which are confronted with each other, by vacuum depositing or sputtering, respectively. Those magnetic metal films 23 and 24 are joined together through a gap member of nonmagnetic substance.

In the magnetic head 20, the trailing core 21 is made of a non-magnetic substance such as ceramic or non-magnetic monocrystal ferrite, while the slider, namely, the leading core 22 is made of a magnetic substance such as ferrite. The trailing core 21 forms a magnetic path with the magnetic metal film 23 only.

Now, the composite type magnetic head 30 shown in FIG. 2 will be described.

The magnetic head 30 includes a core section, namely, a head core 31, which comprises: a trailing core 32; and a leading core 33. The trailing core 32 is made of a non-magnetic substance such as ceramic or a non-magnetic monocrystal ferrite, while the leading core 33 is made of a magnetic substance such as ferrite. Similarly as in the case of the above-described magnetic head 20, magnetic metal films 34 and 35 for forming magnetic circuits are formed on the junction surfaces 32a and 33a of the cores 32 and 33 which are confronted with each other, by vacuum deposition or sputtering.

Other examples of the magnetic head according to the invention will be described with reference to FIGS. 3 and 4.

Figure 3A:
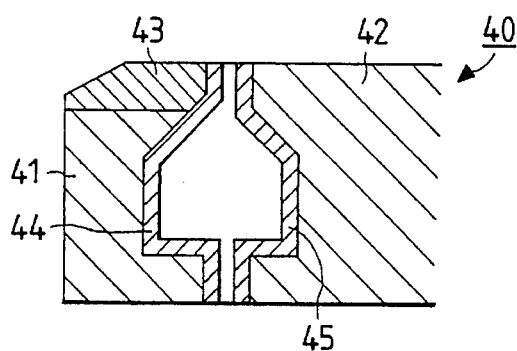
FIG. 3(a) to (c) are sectional views showing essential components of three other examples of the magnetic head of the invention.
Figure 3B:
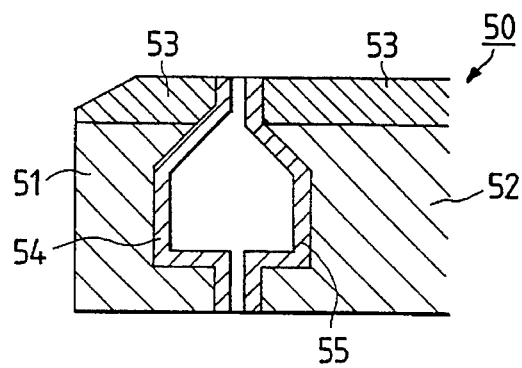
Figure 3C:
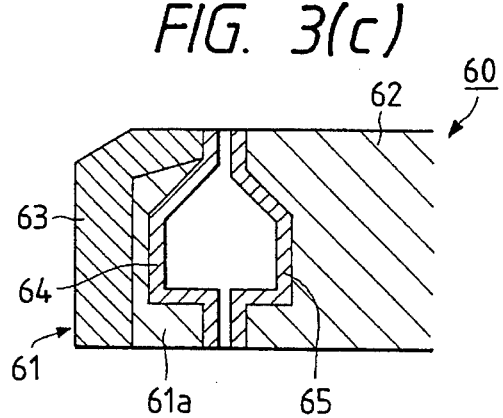
Figure 4A:
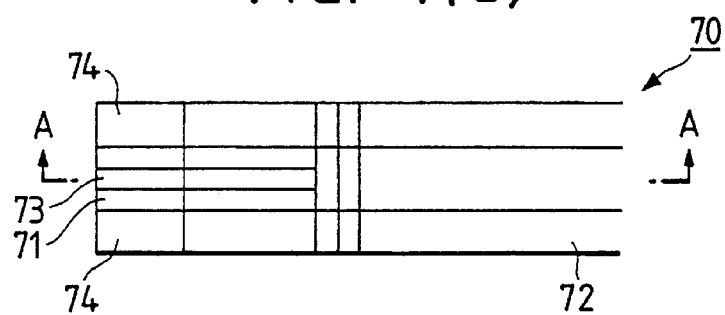
FIG. 4(a) is a plan view showing essential components of the magnetic head of one modification of the magnetic head according to the present invention.
Figure 4B:
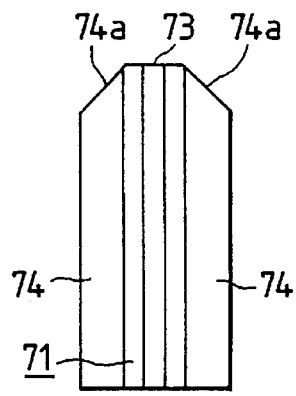
FIG. 4(b) is a left side view of the magnetic head.
Figure 4C:
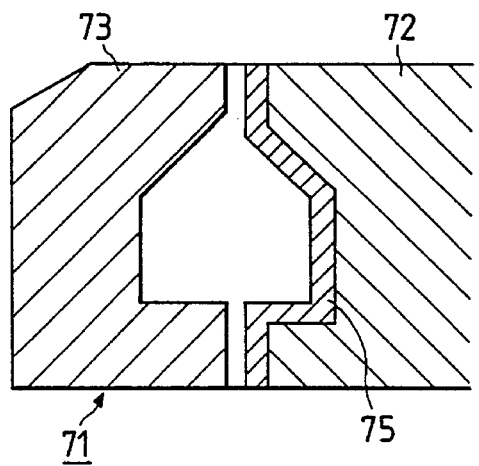
FIG. 4(c) a sectional view taken along line A—A in FIG. 4(a), showing essential components of the magnetic head.
Figure 4D:
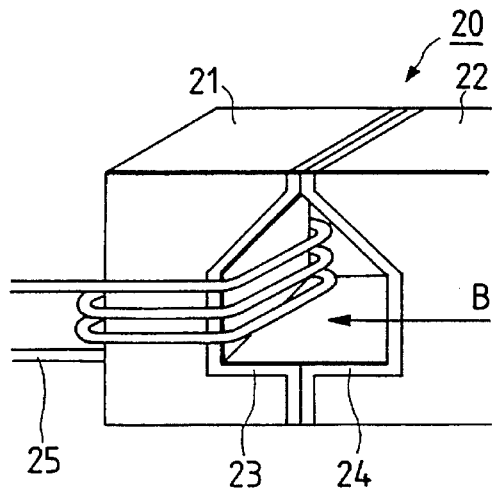
FIG. 4(d) is a perspective view showing essential components of the magnetic head of another modification of the present invention.
Figure 4E:
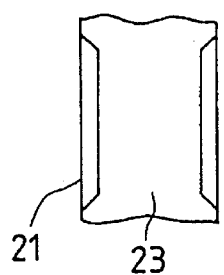
FIG. 4(e) is an enlarged side view showing essential components of the magnetic head as shown in FIG. 4(d)
Figure 5A:
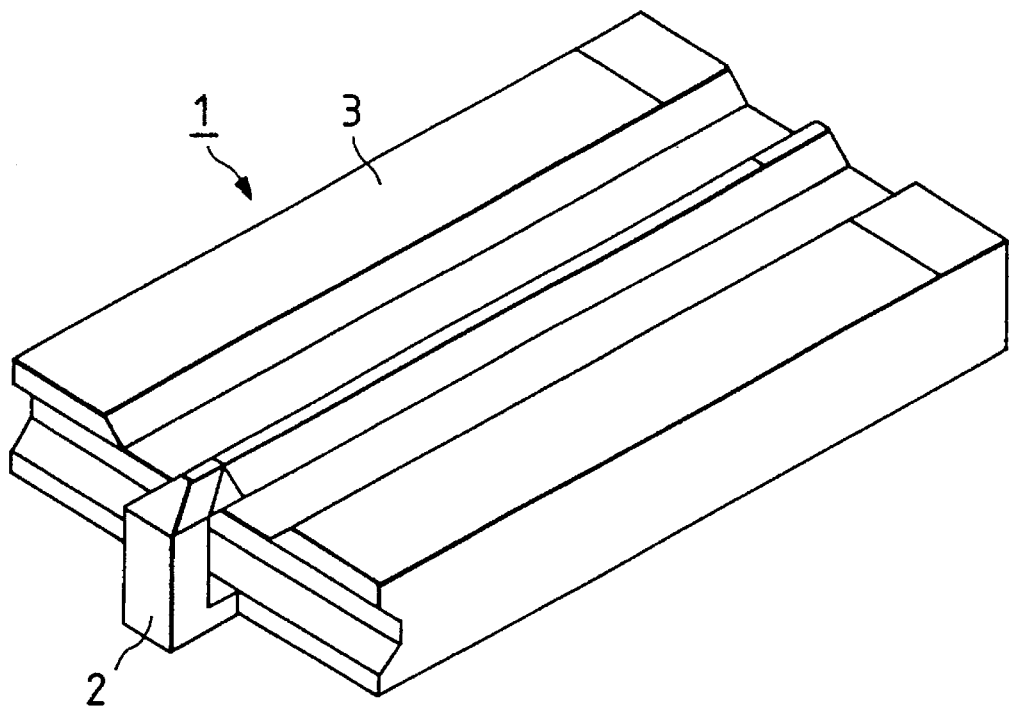
FIG. 5(a) is a perspective view of the magnetic head of one conventional magnetic head.
Figure 5B:
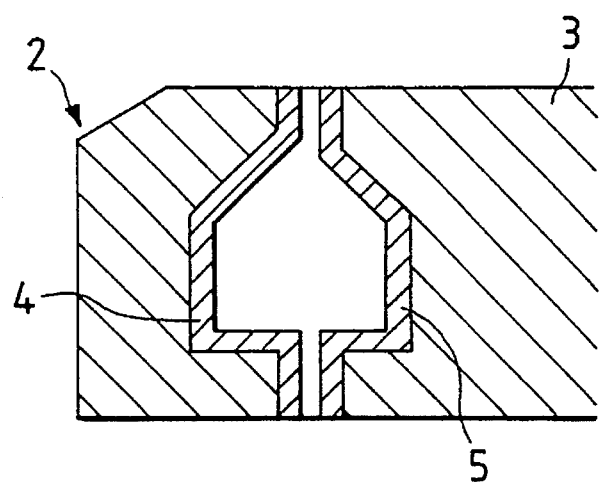
FIG. 5(b) is a sectional view showing essential components of the magnetic head of FIG. 5(a)
Figure 6A:
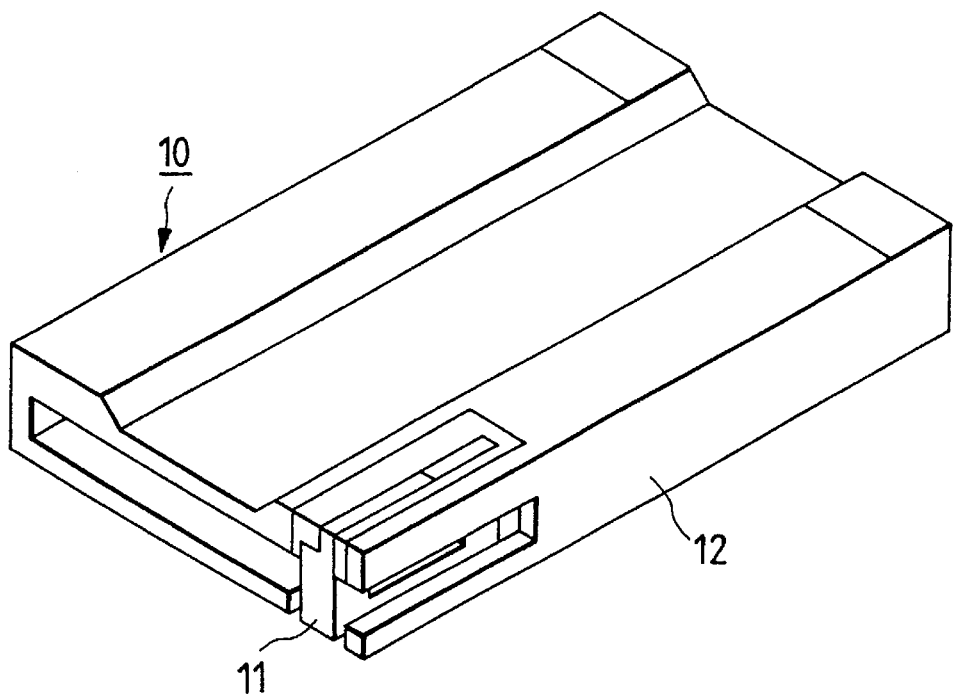
FIG. 6(a) is a perspective view of another conventional magnetic head.
Figure 6B:
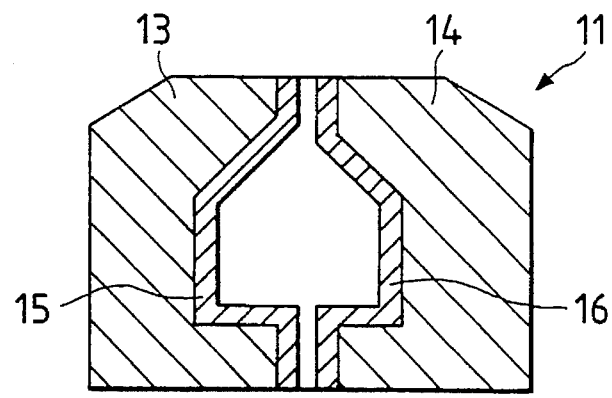
FIG. 6(b) is a sectional view showing essential components of the magnetic head of FIG. 6 (a).

FIG. 3 (a), (b) and (c) show three other examples of the magnetic head which are different in the arrangement of non-magnetic members.

More specifically, FIG. 3 (a) shows a magnetic head 40 comprising a trailing core 41 and a leading core 42. The trailing core 41 has a non-magnetic member 43 of, for instance, non-magnetic monocrystal ferrite in the recording medium confronting surface thereof. The remaining portion is made of ferrite.

The leading core 42 is, in its entirety, made of ferrite. Magnetic metal films 44 and 45 forming magnetic circuits are formed on the surfaces of the trailing core 41 and the leading core 42 which are confronted with each other. The trailing core 41 and the leading core 42 are joined together through the magnetic metal films 44 and 45.

FIG. 3 (b) shows a magnetic head 50 comprising a trailing core 51 and a leading core 52 which are both made of ferrite. The trailing core 51 and the leading core 52 have non-magnetic members 53, for instance, non-magnetic monocrystal ferrite in the recording medium confronting surfaces thereof. Magnetic metal films 54 and 55 for forming magnetic circuits are formed on the junction surfaces of the cores 51 and 52.

FIG. 3 (c) shows a magnetic head 60 comprising a trailing core 61 and a leading core 62. The leading core 62 is made of ferrite. The trailing core 61 is made up of a ferrite member 61a, and a non-magnetic member 63 of, for instance, non-magnetic monocrystal ferrite. Similarly as in the above-described magnetic heads 40 and 50, magnetic metal films 64 and 65 are formed on the junction surfaces of those cores which are confronted with each other.

In the above-described three examples of the magnetic head, the amount of ferrite is reduced to prevent the occurrence of "wiggle" such that the transition of the magnetic domain wall is not smooth.

FIGS. 4 (a) to (c) shows one modification of the magnetic head according to the invention which is different in the arrangement of the magnetic metal film of the trailing core. More specifically, FIG. 4 (a) is a plan view showing essential components of a magnetic head 70, FIG. 4 (b) is a left side view of the magnetic head 70, and FIG. 4 (c) is a sectional view taken along line A—A in FIG. 4 (a), showing essential components of the magnetic head 70.

The magnetic head 70, as shown in FIG. 4 (a) to (c), comprises: a trailing core 71; and a leading core 72 of ferrite. The trailing core 71 is in the form of a lamination, having a magnetic metal film 73 as a middle layer which forms a magnetic circuit, and non-magnetic layers 74 and 74 of non-magnetic monocrystal ferrite on both sides of the magnetic metal film 73.

The non-magnetic layers 74 and 74 have sloped-surfaces 74a and 74a along the outer edges of the recording medium confronting surfaces thereof.

The leading core 72 is made of ferrite, and a magnetic metal film 75 is formed on the junction surface which is confronted with the junction surface of the trailing core 71, thus providing a magnetic circuit.

Another modification of the winding section of the magnetic head 120 will be described with reference to FIG. 4 (d) and (e). More specifically, FIG. 4 (d) is a perspective view showing essential components of the magnetic head 20, and FIG. 4 (e) is an enlarged side view showing essential components of the magnetic head 120.

The magnetic head 120, as shown in FIG. 4 (d) and (e), comprises: a trailing core 121 made of non-magnetic substance; and a leading core 122 made of ferrite. Magnetic metal films 123 and 124 are formed on the junction surfaces of the cores 121 and 122 which are confronted with each other. A coil 125 is wound on the trailing core 121.

FIG. 4 (e) (viewed in the direction of the arrow B in FIG. 4 (d)), the magnetic metal film 123 is chamfered along right and left edges with which the coil 125 otherwise is in contact, so that the non-magnetic substance of the trailing core 121 is exposed in the junction surface thereof, and that the coil 125 is not directly brought into in contact with the right and left edges of the magnetic metal film 123 of the trailing core 121 which forms the magnetic circuit; that is, the coil 125 is prevented from becoming poor in insulation when it is wound on the trailing core 121.

In other words, the coil 125 is liable to become poor in insulation at the right and left edge of the magnetic metal film formed on the inner surface of the trailing core; however, this difficulty scarcely occurs because the surface of the magnetic metal film is, in general, coated with an insulating layer of $SiO_2$ or the like. In order to more positively prevent the occurrence of the difficulty, the magnetic metal film is chamfered along the right and left edge, for instance, by etching. The coil can be more effectively maintained insulated by coating the inner surface of the trailing core with an insulating material to a sufficient thickness.

As is apparent from the above description, the magnetic head of the invention has the following effects or merits:

In the trailing core of the magnetic head, the magnetic circuit is formed by the magnetic metal film formed on the non-magnetic base material thereof which is non-magnetic monocrystal ferrite. Hence, with respect to the coil, the ratio of inductance to output can be reduced with ease; that is, the magnetic head can be improved in high frequency characteristic.

In the magnetic head of the invention, the magnetic circuit is formed by using the thin film, which makes it possible to use a head amplifier which is provided for a film head. Hence, with the magnetic head, the data recording and reproducing operation can be achieved with low impedance noise and good frequency response characteristic.

In a magnetic head made of ferrite, the ferrite is the main factor in the occurrence of "wiggle". However, the magnetic head of the invention, the trailing core uses no ferrite or a minimum amount of ferrite. This effectively prevents the occurrence of "wiggle".

Furthermore, the employment of non-magnetic monocrystal as the base material of the trailing core makes it possible to use a processing method such as chemical etching and laser-assisted etching in which the chemical anisotropy is positively utilized. Hence, processing the track by etching, and removing distorted layers from the film surface by etching can be performed.

As was described above, the base material of the trailing core is the non-magnetic monocrystal ferrite. Hence, in the case where the magnetic metal film is formed, for instance, by sputtering, the magnetic characteristic of the resultant magnetic metal film depends greatly on the state of the substrate. However, by employing as the substrate the non-magnetic monocrystal ferrite selectively orientated, the magnetic metal film can be obtained which is acceptable in magnetic characteristic.

What is claimed is:

1. A magnetic head comprising:

a leading core;

a trailing core having a magnetic circuit winding, said trailing core comprising non-magnetic monocrystal ferrite; and magnetic metal films formed in magnetic path forming regions of said leading core and said trailing core.

2. A magnetic head as claimed in claim 1, wherein said trailing core in its substantial entirety is made of non-magnetic monocrystal ferrite.

3. A magnetic head as claimed in claim 1, wherein at least the surface of said trailing core which is confronted with a recording medium is made of non-magnetic monocrystal ferrite.

4. A magnetic head as claimed in claim 1, wherein said trailing core includes:

a magnetic metal film of said magnetic metal forms serving as a magnetic path; and a pair of non-magnetic monocrystal ferrite layers on first and second sides of said magnetic metal film.

5. A magnetic head as claimed in claim 4, wherein a magnetic metal film of said magnetic metal films is chamfered along first and second edges with which a coil otherwise is in contact such that the trailing core is exposed in a junction surface thereof.

6. A magnetic head as claimed in claim 1, wherein a magnetic metal film of said magnetic metal films is chamfered along first and second edges with which a coil otherwise is in contact in such a manner that the trailing core is exposed in a junction surface thereof.

7. A magnetic head as in claim 1, wherein said leading core comprises a magnetic material.

8. A magnetic head as in claim 7, wherein said magnetic material comprises ferrite, said leading core in its substantial entirety being formed of ferrite.

9. A magnetic head as in claim 1, wherein said leading core in its substantial entirety is formed of ferrite and said trailing core is formed of a non-magnetic monocrystal ferrite portion and a magnetic portion such that said non-magnetic monocrystal ferrite portion is confronted with a recording medium.

10. A magnetic head comprising:

a leading core comprising a magnetic substance;

a trailing core comprising a non-magnetic monocrystal substance and having a magnetic circuit winding; and a magnetic metal film formed on said trailing core, wherein said leading core and said trailing core each have a junction surface confronting a junction surface of the other of said leading core and said trailing core.

11. A magnetic head as in claim 10, wherein said magnetic substance of said leading core comprises ferrite.

12. A magnetic head as in claim 10, wherein said non-magnetic monocrystal substance of said trailing core is non-magnetic monocrystal ferrite, said trailing core in its substantial entirety being formed of said non-magnetic monocrystal ferrite.

13. A magnetic head as claimed in claim 12, wherein said magnetic metal film of said trailing core is chamfered along first and second edges with which a coil otherwise is in contact such that the trailing core is exposed in a junction surface thereof.

14. A magnetic head as in claim 10, wherein said trailing core includes a non-magnetic monocrystal ferrite portion and a magnetic portion such that said non-magnetic monocrystal ferrite portion confronts a recording medium.

15. A magnetic head as in claim 10, wherein said leading core and said trailing core each comprise a non-magnetic monocrystal ferrite portion and a magnetic portion such that said nonmagnetic monocrystal ferrite portions confront a recording medium.

16. A magnetic head as in claim 10, wherein said trailing core includes first and second non-magnetic monocrystal ferrite layers, wherein said magnetic circuit winding is formed as a laminate between said first and second non-magnetic monocrystal ferrite layers.

17. A magnetic head as in claim 10, further comprising a coil wound on said trailing core and means for insulating said coil from said magnetic circuit winding.

18. A magnetic head as in claim 17, wherein said means for insulating said coil includes edges of said magnetic metal film having a chamfered structure.

19. A magnetic head as in claim 10, further comprising a coil wound on said trailing core, wherein first and second edges of said magnetic metal film each having a chamfered structure.

20. A magnetic head as in claim 10, further comprising a magnetic metal film on said leading core, wherein said magnetic metal films of said trailing core and said leading core are positioned on said junction surfaces of said leading core and said trailing core.

* * * * *